INVENTORS
HARRY M. VALENTINE
FRANK R. SCHUBERT

BY
Scrivener Parker Scrivener + Clarke
ATTORNEYS

INVENTORS
HARRY M. VALENTINE
FRANK R. SCHUBERT

United States Patent Office 3,504,946
Patented Apr. 7, 1970

3,504,946
SPRING BRAKE CONTROL VALVE
Harry M. Valentine and Frank R. Schubert, Elyria, Ohio, assignors to Bendix-Westinghouse Automotive Air Brake Company, Elyria, Ohio, a corporation of Delaware
Filed Oct. 3, 1968, Ser. No. 764,754
Int. Cl. B60t 13/38
U.S. Cl. 303—9
10 Claims

ABSTRACT OF THE DISCLOSURE

For use in a dual circuit braking system in which one circuit serves brakes also carrying spring brakes, valve means including a pressure responsive element normally balanced by pressure in the two circuits but moved to effect release of pressure from the spring brakes under the control of the usual pedal operated brake valve upon failure of that circuit serving the brakes carrying the spring brakes, the valve means being arranged to lap to effect partial or graduated application of the spring brakes in accordance with control pressure from the brake valve. A feature of the valve is a pressure regulating ability to prevent the build up and consequent delayed release of excess pressure in the release cavity of the spring brakes over that required to release the brakes.

---

Figure 1:
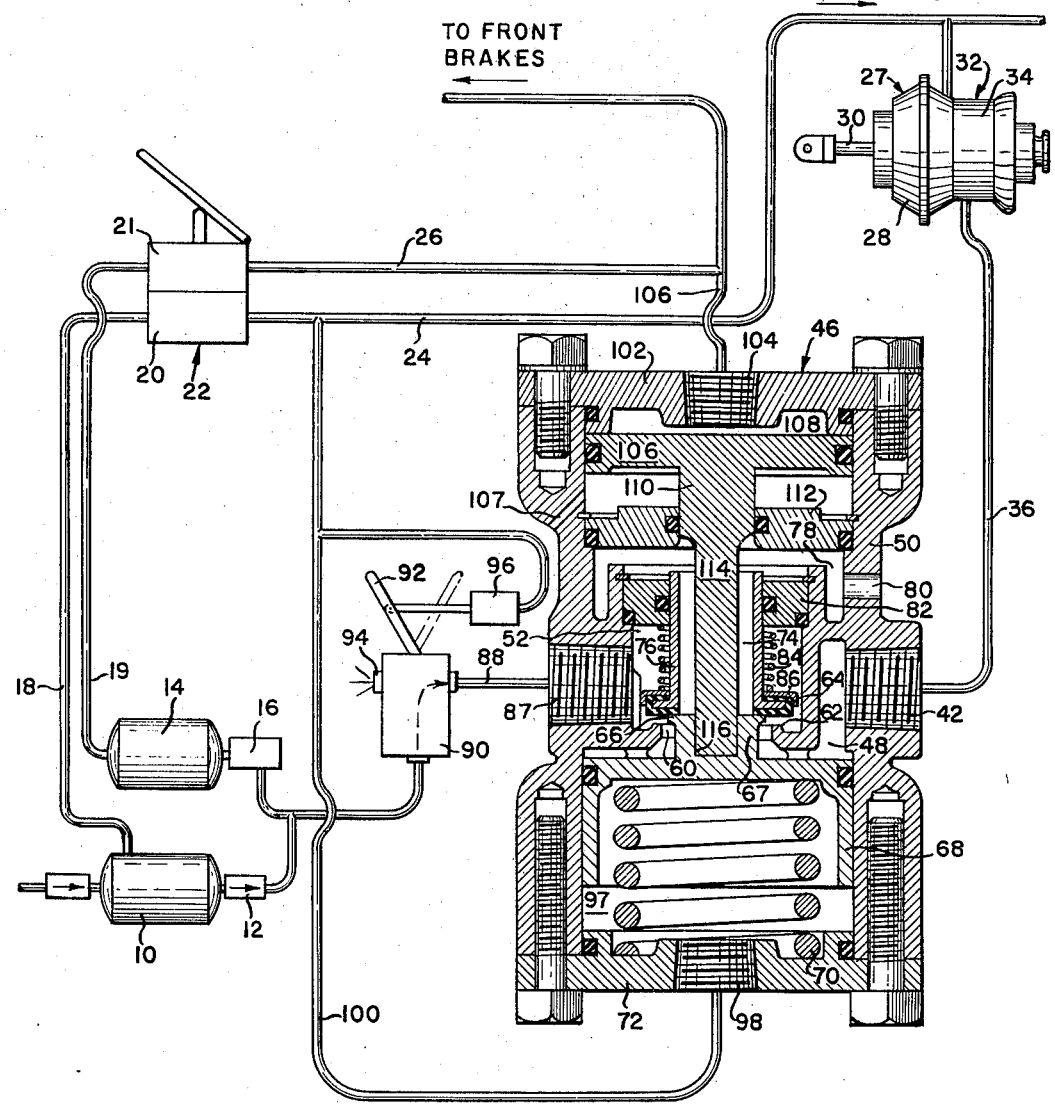

This invention relates to valves for use in vehicle fluid pressure braking systems and more particularly to a valve for controlling fluid pressure released, spring applied emergency brakes.

Fluid pressure released, spring applied brakes are well known and comprise a spring actuator whose spring is held in compressed inactive condition by fluid pressure supplied to a release chamber. When this pressure is released, the spring expands and applies a plunger to the push plate of a tandemly mounted service brake to apply the brakes solely through the action of the spring. Automatic valve means are provided to release the pressure when the service or emergency pressure in the braking system falls to an unsafe low level. Heretofore, the automatic release system has operated to instantly vent the release chamber of the spring brake to atmosphere with the result that the spring brakes have been abruptly applied or dynamited onto their fullest extent so as to bring a vehicle to an immediate halt and this can be extremely dangerous on a crowded highway.

The problem of dynamiting spring brake applications in emergencies is compounded in dual circuit brake systems wherein the front brakes, for example, are controlled by one circuit having its own pressure source and the rear brakes, including also the spring application means, are controlled by the second circuit and its own separate pressure source, the respective service brakes supplied by the two circuits being controlled by a pair of tandemly mounted brake valves responsive to the movement of a single brake pedal. In a dual circuit system, it is desirable to have the emergency brakes automatically applied upon loss of pressure in one of the circuits.

The danger of a dynamiting application of the emergency spring brakes can be avoided by providing means for gradually releasing the pressure from the release chamber of the spring brake and the broad object of the present invention is to provide for use in a dual circuit brake system valve means which will automatically, upon the loss of service brakes in one of the circuits, graduate or release at a controlled rate the pressure from the spring brakes so that a vehicle is brought to a gradual stop.

Briefly, the invention embodies a control valve including a combined inlet and exhaust valve which is retained by resilient means in a position connecting the release chamber of the spring brake with a source of fluid pressure. However, when the source of fluid pressure approaches a dangerously low level so that the spring brake tends to be applied, the operator can supply pressure at will to a fluid pressure responsive member which overrides the resilient means to disconnect the spring brake from its source of fluid pressure and connect the release chamber of the spring brake to atmosphere under the control of the pressure supplied by the operator to the pressure responsive means whereby the pressure in the spring brake may be released at a gradual rate.

Figure 2:
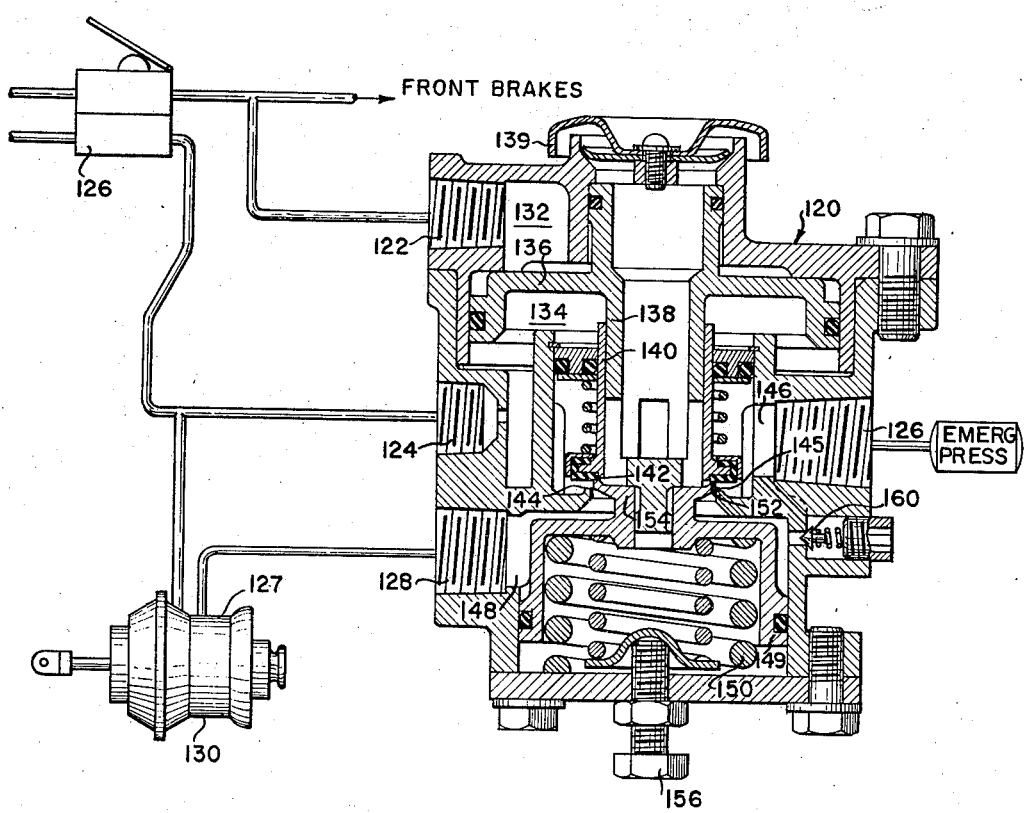

In the drawings:

FIG. 1 is a schematic representation of a dual circuit fluid pressure brake system incorporating a valve embodying the features of the present invention; and FIG. 2 is a view similar to FIG. 1 but showing a modification of the control valve of FIG. 1.

Referring now to the drawings, FIG. 1 illustrates a dual pressure braking system comprising a reservoir 10 having an outlet through a check valve 12 to a reservoir 14 by way of a pressure protection valve 16 such as that shown in the patent to Valentine No. 3,236,256 which automatically closes at a predetermined pressure to prevent the passage of fluid therethrough when the pressure on the upstream side has fallen to the predetermined level.

The reservoirs 10, 14 have respective outlet pipes 18, 19 leads to the inlet cavities of lower and upper parts 20, 21 of a dual pressure brake valve 22 which may be of the type shown in the patent to Herold No. 3,266,850.

Leading from the parts 20, 21 of the brake valve 22 are a pair of outlet pipes 24, 26 connected respectively to the rear and front service brakes of a truck or trailer. The rear or trailer service brakes, indicated by the numeral 27, includes the usual brake chamber 28 and push rod 30 and includes also a tandemly mounted spring brake 32 having a release chamber 34, to and from which pressure is admitted and exhausted by way of a pipe 36 to control the spring brake.

The pipe 36 is connected to delivery port 42 of a control valve 46 constructed in accordance with the present invention. The delivery port 42 leads into a delivery cavity 48 in the valve body 50 and the delivery cavity 48 is connected to an inlet cavity 52 through a central inlet port 60 surrounded by a valve seat 62 engageable by a combined inlet and exhaust valve 64 to disconnect the inlet and delivery cavities 52, 48.

The combined inlet and exhaust valve 64 is also engageable by an exhaust valve 66 defined by the peripheral edge of a central boss 67 carried by an emergency piston 68 which is urged at all times by a relatively heavy spring 70 acting against a lower closure member 72 and the piston 68 as shown to urge the exhaust valve 66 into engagement with the combined exhaust and inlet valve element 64 so as to disconnect the deliver cavity 48 from an exhaust passage 74 in a sleeve member 76 carrying the valve element 64 and connected to atmosphere through an exhaust cavity and port 78, 80. The sleeve 76 sealingly slides through a wall member 82 and a light spring 84 acts between the lower surface of the wall member and the upper surface of a valve guide 86 to urge the sleeve 76 and the valve element 64 in the direction of the inlet valve seat 62..

The inlet cavity 52 is connected by way of a port and pipe 87, 88 with the outlet of a parking valve 90 having an inlet which is connected as shown to reservoir 10. The valve 90 is provided with a control handle 92 which, in the solid line position of the drawing, connects the reservoir 10 with the inlet port 87 of the valve 46 and when the handle is moved to the dotted line position, the valve 90 serves to disconnect the reservoir 10 from the inlet port 87 while connecting the latter to atmosphere through an exhaust port 94. If desired, a small fluid pressure actuator 96 can be connected by way of suitable piping to the service pipe 24 so that the handle 92 is moved to the full line position of the drawing during a normal service brake application to ensure that pressure is admitted to the release chamber of the spring brake so as to prevent possible doubling up of braking effort on the slack adjuster.

Referring again to the valve 46, it will be noted that the cover member 72 defines with the piston 68 a pressure chamber 97 which is connected by way of a port 98 and pipe 100 with the service conduit 24 connected to the outlet or deliver side of the lower part of the dual brake valve 22. Thus when service pressure is delivered from the lower part of the valve 22 to the service pipe 24 it is simultaneously delivered by way of the pipe 100 and port 98 to the chamber 97 beneath the piston 68 where it acts in concert with the spring 70 to retain the piston 68 in the position of the drawing with the exhaust valve 66 engaging the combined exhaust and inlet valve element 64 to disconnect the delivery cavity 48 from the exhaust port 80 while, at the same time, disengaging element 64 from inlet valve seat 62 to freely connect the inlet port 87 and cavity 52 with the delivery cavity and port 48, 42.

The upper end of the valve 46 is provided with a closure member 102 having a central port 104 therethrough which is connected by way of a pipe 106 with the service pipe 26 connected to the delivery side of the upper part 21 of the dual brake valve 22. The inner side of the closure member 102 defines with the upper side of a piston 106 a pressure cavity 108 which receives the same service pressure which is delivered to the front service brakes by the brake valve 22. The lower side of the piston 106 is exposed to atmosphere through port 107 and is provided with an extension 110 which is slidably and sealingly received in a central opening of a wall member 112. Integral with the extension 110 is a plunger 114 of reduced diameter which is in tight engagement with a recess 116 in the boss 67 on the upper side of the piston 68, the arrangement being such that the upper piston 106 and the lower piston 68 are so connected together that they move in unison.

In operation, let it be first assumed that the reservoirs 10, 14 contain fluid at a pressure above a predetermined safe level. Under normal conditions, the operator moves the handle 92 of the parking valve 90 to the full line position whereupon fluid pressure is admitted from the reservoirs through the valve 90 to the pressure cavity 34 of the spring brake by way of the inlet port and cavity 87, 52, the central port 60, delivery cavity and ports 48, 42 and pipe 36 to move the spring brake to its inactive or release position.

With the spring of the spring brake de-activated by pressure as above described, when the operator depresses the brake pedal of the dual circuit brake valve 22, service pressure is delivered by way of the pipes 24, 26 to the rear service brake chambers 28 and to the front brake chambers to apply the brakes. Simultaneously, service pressure is delivered by way of the pipes 106, 100 to the upper and lower ports 104, 98 to act downwardly on the upper piston 106 and upwardly in concert with the spring 70 on the lower piston 68. In view of the fact that the combined force of the spring and pressure acting on the lower piston is greater than the pressure force acting downwardly on the piston 68 and on the upper piston 106, the parts of the valve remain in the position of the drawing and the spring brake remains de-activated just as if the valve 46 were not in the circuit. Under normal conditions, if the operator, after bringing the vehicle to a stop, wishes to park the vehicle by the spring brake, he merely moves the parking handle 92 to the dotted line position whereupon the fluid pressure in the release cavity 34 of the spring brake is connected to the atmospheric port of the parking valve through the valve 46 again, exactly as if the latter were not in the circuit.

Assume now that the fluid pressure for the rear service and/or trailer brakes is depleted or a leak develops in conduit 24. Under these conditions, the pressure protection valve 16 closes and of course the check valve 12 closes so that pressure is trapped in the release cavity 34 of the spring brakes to retain these in released position. Under these conditions, when the operator next applies the brakes, which obviously will be in a place where brake application or vehicle slow-down is appropriate, in any event, service pressure will be delivered by way of the pipe 26 to the upper piston 106, but in view of the fact that there is no pressure available for delivery to beneath the lower piston 68, the service pressure acting downwardly on the upper piston 106 in concert with release pressure acting on the top of piston 68 exerts sufficient force thereon to overcome the upward force of the lower spring 70 whereupon the combined inlet and exhaust valve is moved downwardly against the force of the spring 70 to first close off the inlet port between the inlet and delivery cavities 52, 48 of the valve 46 and thereafter to open the exhaust valve. Because the pressure in the release cavity 34 of the spring brake had also been acting downwardly on the piston 68 in concert with the downward force of the service pressure acting on the upper piston 106, as the pressure in the release cavity 34 is exhausted to atmosphere, the force of the spring 70 will move the piston 68 upwardly until the exhaust valve 66 lays whereby pressure is momentarily trapped in the release cavity 34 to prevent the spring 36 from expanding to its fully applied position. If the pressure in the upper cavity 108 is permitted to increase it again moves the piston 106 downwardly to reopen the exhaust valve and relieve additional pressure from the release cavity 34 whereby the pressure is relieved from the spring brake cavity 34 until the valve again laps with the spring brake being only partially applied which may be sufficient to bring the vehicle to a safe but gradual stop without the danger of a dynamiting application of the brakes.

With reference now to FIG. 2, the valve 120 there illustrated is substantially identical to the valve 46 of FIG. 1 and includes a pair of inlet ports 122, 124 connected respectively to the upper and lower delivery sides of a dual pressure brake valve 126 controlling service braking to separate sets of brakes, one of which may include a spring brake 127 as shown. The valve 120 also has an inlet port 126 which may be connected by way of a parking valve (not shown) with a source of fluid pressure and a delivery port 128 which is connected to the release cavity 130 of the spring brake 127.

The inlet ports 122, 124 lead to cavities 132, 134 on opposite sides of an upper piston 136 having a hollow plunger 138 connected to an exhaust port 139 and slidably receiving a sleeve 140 carrying at its lower end a combined inlet and exhaust valve element 142 adapted to cooperate with an inlet valve seat 144 surrounding a port 145 connected an inlet cavity 146 with a delivery cavity 148. The lower wall of the delivery cavity 148 is defined by the upper side of a cup shaped piston 149 which is urged to the position of the drawing by adjustable spring means 150 so that an exhaust valve 152 carried by a boss 154 integral with the piston 149 engages the element 142 to disconnect the exhaust port 139 from the delivery cavity 148 while retaining the element 142 out of engagement with the seat 144 so as to connect the inlet and delivery cavities 146, 148.

As so far described the valve 120 is similar to the valve 46 of FIG. 1 differing primarily in that in the former service pressure from the circuit connected to the combined service and spring brakes is led to the cavity 134 beneath the upper piston rather than to the cavity 97 beneath the piston as in FIG. 1. With this arrangement the spring means 150 may be adjusted by an adjusting bolt 156 so that the piston 149 is responsive to a selected pressure at the inlet port 126 to move downwardly and lap the valve element 142 as soon as a predetermined pressure just sufficient to release the brakes has been delivered to the release chambers of the spring brakes. Thus the piston 149 and the valve element 142 serve as a pressure regulating valve to prevent the delivery to the spring brake release chamber of more pressure than is required to release the brakes. Such unneeded additional pressure creates a delay problem in setting the spring brakes due to the additional time required to blow down the unneeded high pressure in the release cavity until the spring brakes apply.

From the foregoing it will be apparent that in the valve of FIG. 2, the inlet and delivery cavities are normally disconnected and the inlet and exhaust valves are lapped. Under these circumstances, it can be seen that when the parking valve is operated to apply the spring brakes, the spring brakes might not respond due to possible trapping of release pressure in the spring brake release cavity. To present this, a check valve 160 serves to by-pass the lapped valve element 142 to ensure that the pressure in the release cavity is relieved through the parking valve at the will of the operator.

In the event that service pressure is not delivered to those brake chambers carrying the spring brakes, then service pressure is also not delivered to the cavity 134 beneath the upper piston 136. Under these circumstances when the operator depresses the brake pedal for a normal (i.e., less than full) brake appliction, the piston 136 is moved downwardly to open the exhaust valve 152 and connect the spring brake release cavity to atmosphere through the exhaust port 139. When the pressure in the release cavity and hence the pressure acting on the upper side of the emergency piston 149 has blown down sufficiently the exhaust valve again laps resulting in a partial or graduated application of the spring brake precisely as in the case of the valve of FIG. 1.

From the foregoing it should be apparent that the valves of the invention permit controlled application of the spring brakes rather than the abrupt application as heretofore. Additionally, the invention provides a valve which accomplishes the foregoing while at the same time it operates as a pressure regulating valve to prevent the delivery of unneeded excessive pressure to a spring brake which might delay the controlled application of the brake.

It will be apparent to those skilled in the art that the valve of the invention is susceptible of a variety of modifications without departing from the scope of the invention.

What is claimed is:

1. For use in a dual pressure braking system including a pair of pressure pipes for effecting the delivery of service pressure to service actuating means for separate brakes, at least one of said brakes being also controlled by a spring applied, pressure released brake actuator, the invention which comprises a control valve for said spring brake comprising a housing having inlet, delievry and exhaust ports adapted to be connected respectively to a source of fluid pressure, a spring brake, and atmosphere, valve means in said housing for controlling said ports, a fluid pressure responsive element having a part subjected at all times to the pressure at the delivery port and operatively connected to said valve means, said element being movable between a first position where said valve means connects said inlet and delivery ports and disconnects the latter from said exhaust port, a second lap position wherein said valve means disconnects said delivery port from said inlet and exhaust ports, and a third position wherein said valve means connects said exhaust and delivery ports while disconnecting the latter from said inlet port, resilient means acting on said part in opposition to the pressure at said delivery port, a second pair of ports in said valve body each adapted to be connected to a respective one of said pair of service pressure pipes, said fluid pressure responsive element including opposed pressure faces subjected at all times to the pressures at the respective ports of the second pair, the effective areas of said faces being selected that during a normal brake application the forces of the service pressures acting on the faces are substantially balanced so that said pressure responsive means occupies a first inactive position, said fluid pressure responsive element constructed and arranged to exert a force in opposition to said resilient means when the pressure at a selected one of said second pair of ports exceeds the pressure at the other by a predetermined amount to move said valve means to its third position and relieve the pressure at said delivery port until the combined forces acting on said fluid pressure responsive element are overbalanced by said resilient means so that said valve means is moved to its second lap position.

2. The control valve of claim 1 where the force of said resilient means is selected relative to the effective area of said part that said part is moved automatically and independently to its second lap position when the pressure at said delivery port is at a predetermined value.

3. The control valve of claim 2 including a by-pass passage connecting said delivery and inlet ports around said valve means and a one-way check valve in said passage arranged to permit fluid flow from said delivery to said inlet ports but not in the reverse direction.

4. The control valve of claim 1 wherein said fluid pressure responsive element comprises a piston and the opposed pressure faces comprises the opposite sides of said piston.

5. The control valve of claim 1 wherein the fluid pressure responsive element comprises a member having one pressure face exposed to the pressure at one of said second pair of ports, and the second pressure face comprises the side of said part opposite the side thereof exposed to the pressure at said delivery port, said member and part being co-axially arranged in said housing with respect to each other, and axially extended rigid plunger means interconnecting said member and part.

6. The control valve of claim 2 including adjusting means for adjusting the force with which said resilient means opposes movement of said part in response to pressure at said delivery port.

7. The control valve of claim 6 including a by-pass passage connecting said delivery and inlet ports around said valve means and a one-way check valve in said passage arranged to permit fluid flow from said delivery to said inlet ports but not in the reverse direction.

8. For use in a dual pressure braking system including a pressure source, a pair of pressure pipes for effecting the delivery of service pressure from said source to service actuating means for separate brakes, at least one of said brakes being also controlled by a spring applied, fluid pressure released brake actuator, and a manually operable valve for controlling pressure from said source to said pipes, the invention which comprises a differential control valve communicating with each of said pressure pipes and responding to a pressure differential in the fluid pressure of said pipes such as to maintain the spring brake actuator inactive when the fluid pressure in said pipes is substantially equal, and automatically rendering the spring brake actuator of said one brake operative when the fluid pressure supplied said one brake is less than that supplied the other brake by a predetermined amount, said control valve including a movable part subject at all times to the fluid pressure in the spring applied, fluid pressure released actuator for graduating the release of fluid pressure therefrom in accordance with the fluid pressure supplied the other brake.

9. The control valve of claim 8 wherein said control valve includes a piston having opposed pressure faces respectively subjected to the fluid pressure of said pipes.

10. The control valve of claim 9 wherein movement of said part in response to the fluid pressure in the spring applied, fluid pressure released actuator is resiliently opposed.

References Cited

UNITED STATES PATENTS

| | | | |
|---|---|---|---|
| 3,188,916 | 6/1965 | Beatty | 303—71 X |
| 3,309,149 | 3/1967 | Bueler | 303—13 |
| 3,394,968 | 7/1968 | Bueler | 303—68 |
| 3,419,315 | 12/1968 | Bueler | 303—71 |

MILTON BUCHLER, Primary Examiner

J. J. McLAUGHLIN, JR., Assistant Examiner

U.S. Cl. X.R.

137—116, 596.2, 627.5; 303—6, 13, 52, 68